E. H. MESSITER.
INTEGRATING MECHANISM.
APPLICATION FILED SEPT. 20, 1917.

1,307,369.

Patented June 24, 1919.
3 SHEETS—SHEET 1.

Inventor
Edwin H. Messiter
By his Attorneys
Marshall & Dearborn

E. H. MESSITER.
INTEGRATING MECHANISM.
APPLICATION FILED SEPT. 20, 1917.
1,307,369.
Patented June 24, 1919.
3 SHEETS—SHEET 2.
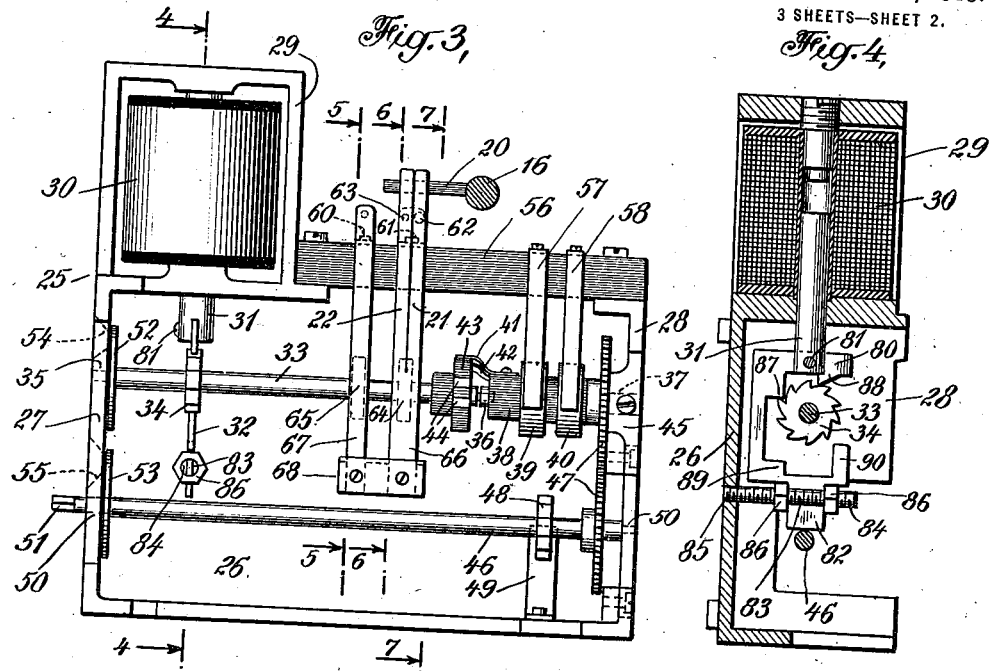
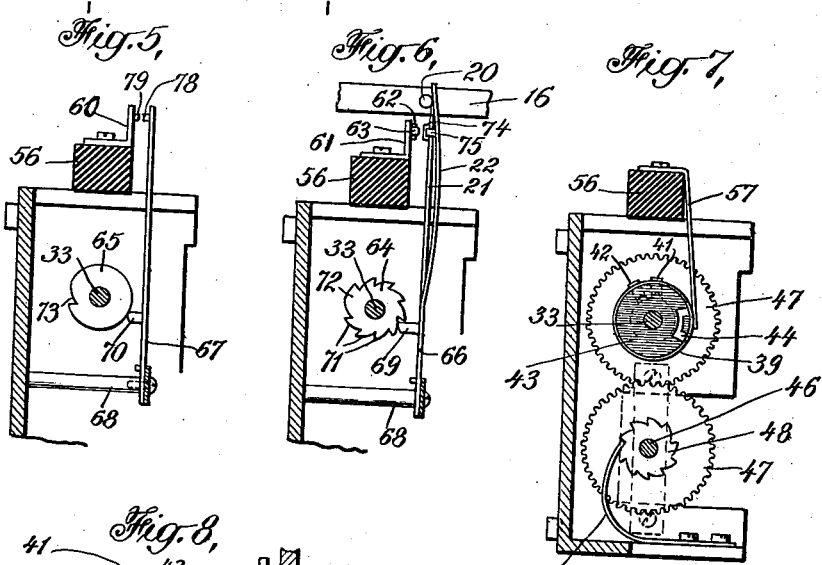
Inventor
Edwin H. Messiter
By his Attorneys
Marshall & Dearborn

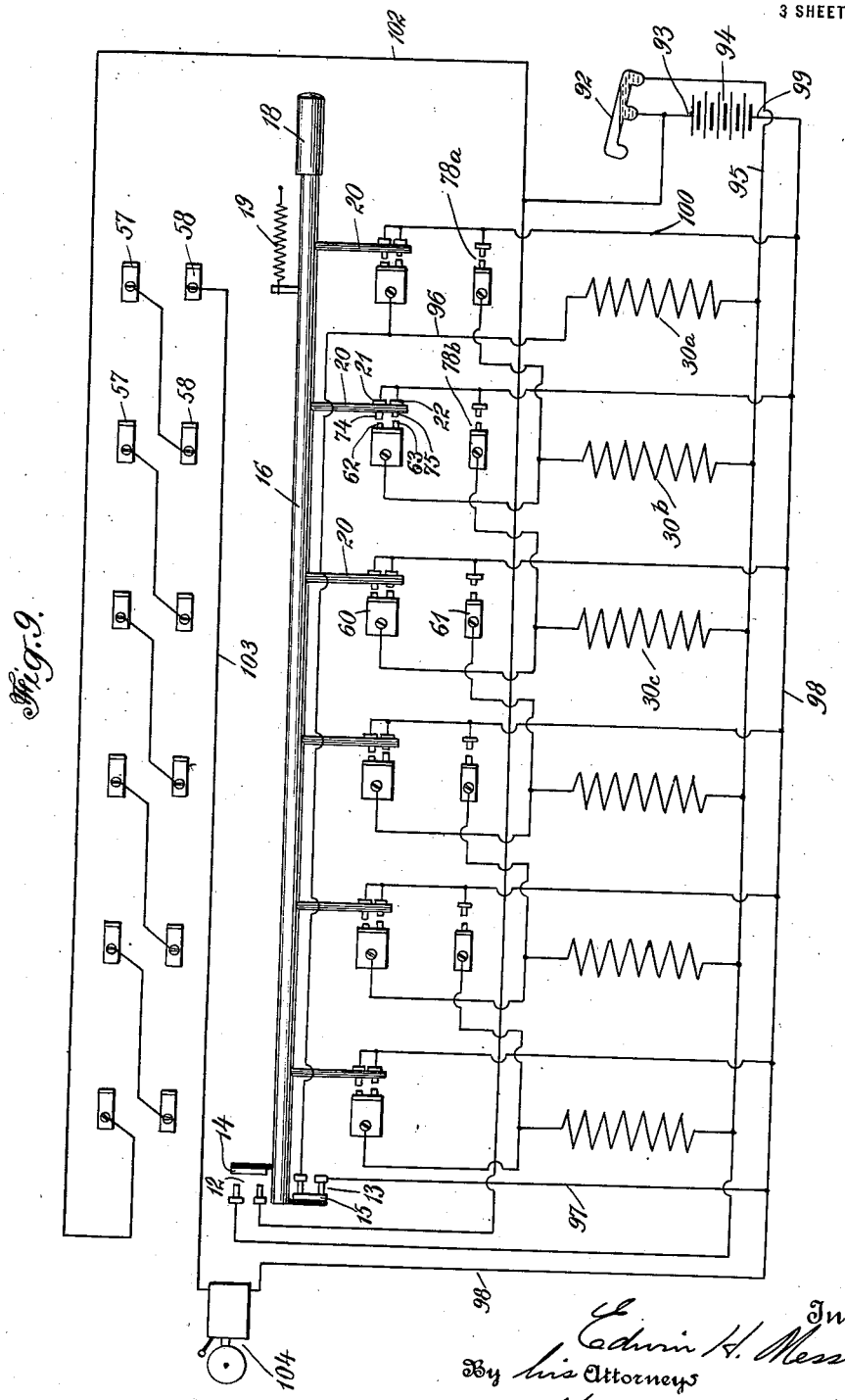

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

INTEGRATING MECHANISM.

1,307,369.  Specification of Letters Patent.  Patented June 24, 1919.

Application filed September 20, 1917. Serial No. 192,282.

*To all whom it may concern:*

Be it known that I, EDWIN H. MESSITER, a citizen of the United States of America, and a resident of Brooklyn, county of Kings, and State of New York, have invented certain new and useful Improvements in Integrating Mechanism, of which the following is a specification, reference being had to the accompanying drawings, forming a part thereof.

My invention relates to integrating or counting devices and has for one object to provide a simple and compact integrating unit, one or more of which may be utilized depending on the number of digits in the maximum total to be integrated by the machine.

Another object is to provide an inexpensive and reliable actuator for a counter unit of the aforesaid character.

Still another object is to provide in combination with a device of the aforesaid character, means for producing a signal to designate when a predetermined number has been counted.

Integrating mechanisms are required for various purposes. For example, an automatic weighing machine or the like may readily be arranged to make and break an electric circuit for each ton or other unit of weight of material carried by the weigher.

The apparatus of my present invention is not limited to any special field of usefulness but is adapted to integrate or count the number of times an electric circuit is made and broken, and this may be used to total the tons of material delivered from the weighing machine and for various other purposes.

In order that my invention may be thoroughly understood, I will now proceed to describe the same in the following specification, and then point out the novel features thereof in appended claims.

Referring to the drawings:

Fig. 3 is a sectional elevation of one of the units of which the structure shown in Figs. 1 and 2 is composed.

Fig. 4 is a sectional view taken on the line 4—4 of Fig. 3 and showing particularly the actuator for the device.

Figure 1:
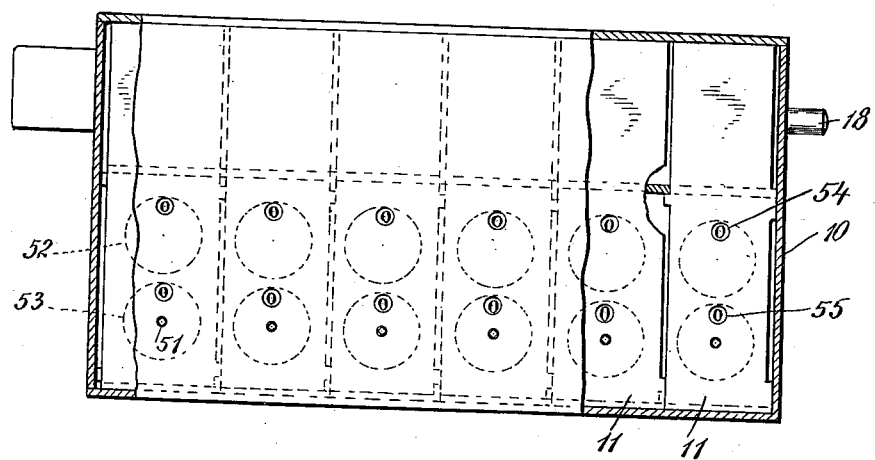
Figure 1 is a partial sectional front elevation of an integrating mechanism arranged and constructed in accordance with my invention and composed of a plurality of interchangeable units each of which constitutes an embodiment of my invention.

Figs. 5, 6 and 7 are sectional details taken respectively on the lines 5—5, 6—6 and 7—7 of Fig. 3.

Fig. 8 is a sectional plan view showing a portion of the actuator spindle.

Fig. 9 is a diagrammatic view showing the circuit connections for the structure shown in the previous figures.

Special reference may first be had to Figs. 1 to 8 inclusive.

The structure here shown comprises an outer box or casing 10 in which are disposed a plurality or counter units 11. These units or sections are identical and any number may be assembled, depending upon the service requirements to be met by the apparatus. The units are provided with interlocking projections as hereinafter explained and they may be held together by any suitable means such as clamping rods (not shown), although a casing or box such as the casing 10, will usually be preferable in order to give the device the appearance of a unitary structure. The device as a whole is provided with a pair of electric circuit switches 12 and 13 which are used for setting.

The switches comprise movable contact members 14 and 15 which are secured to a reset bar 16. This bar extends through the casing 10, being slidably mounted in bearings formed therein, and projects at one end which constitutes a push button 18. A spring 19 tends to hold the bar 16 in such position as to close the switch 13 and open the switch 12. When the push button 18 is pressed inwardly in opposition to the spring the switch 12 is closed and the switch 13 is opened.

The bar 16 has a plurality of lateral projections 20 which hold the movable contacts 21 and 22 of reset switches, which form parts of the several units, away from their coöperating stationary contacts, except when the bar is pressed inwardly in opposition to the spring 19.

Inasmuch as the integrating or counter units are identical a description of one will suffice for all. As shown in Figs. 3 to 8, each unit or section comprises a frame 25 having a perforated side plate 26, end frames 27 and 28, and a substantially rectangular magnet core 29 in which a coil 30 of the actuating magnet is disposed. This magnet furthermore comprises a movable armature 31 from which an actuator having the form of an escapement 32 depends.

A spindle 33 extends through the jaws of the escapement actuator 32 and a ratchet wheel 34 is affixed thereto in position to coöperate with the jaws of the actuator. The spindle 33 is supported at one end in a bearing 35 provided in the end frame 27 and at the opposite end is mounted in a socket or pivot bearing 36 provided in the end of a stationary pin or shaft 37 which is coaxial with the spindle and has rotatable thereon a sleeve or bushing 38 of insulating material. Mounted on this sleeve or bushing are a pair of contact rings 39 and 40, and a pair of axial contact fingers 41 and 42.

These fingers coöperate with a commutator sleeve 43 mounted on the adjacent end of the spindle 33. The commutator has a pair of interconnected segments 44 which are adapted to be engaged under predetermined conditions by the respective contact fingers 41 and 42.

The pin or shaft 37 is secured in a socket 45 formed in the end plate 28 and the sleeve 38 is operatively connected to a shaft 46 by gear wheel 47.

The shaft 46 has affixed to it a ratchet wheel 48 coöperating with a stationary resilient pawl 49. It is rotatively mounted in bearings 50 provided in the respective end frames 27 and 28 and extends through the front end frame or plate 27 where it is squared or otherwise formed as designated at 51 to receive a key or wrench by which it may be set to any predetermined position.

The shaft 46 is substantially parallel to the spindle 33 and a pair of circular number plates 52 and 53 are respectively affixed to the shafts 33 and 46 adjacent to the end frame 27 which is perforated at 54 and 55 to exhibit one of the numbers on each number plate.

An insulating block or bar 56 is secured to the frame above the shaft 33 and has affixed to it a pair of resilient contact fingers 57 and 58 which make contact respectively with the contact rings 39 and 40 of the sleeve 38. The block is furthermore provided with a pair of stationary contacts 60 and 61 of which the contact 61 is formed with two contact points 62 and 63.

Mounted on the spindle 33 are a pair of cams 64 and 65 which govern the action of a pair of resilient contact arms 66 and 67. These arms are affixed to a bracket 68 which is mounted on the frame 25 of the unit and they extend upwardly in position to coöperate with the contact members 61 and 60 respectively. The contacts 66 and 67 are provided with lugs 69 and 70 which directly coöperate with the cams 64 and 65. The cam 64 has the form of a ratchet wheel having nine teeth 71 spaced apart by substantially a tenth of a circumference, the teeth being equal in size with the exception of one which is designated 72 and is wider than the others.

The cam 65 is cylindrical except for a single notch 73.

The contact arm 66 is divided or bifurcated at its outer end into a pair of fingers 21 and 22 to coöperate with the respective contact points 62 and 63.

The contact finger 21 is offset relative to the finger 22 and consequently the circuit is first made and broken at the contact point 62 which is adapted to take the arc and prevent the contact point 63 from becoming damaged.

The fingers 21 and 22 are preferably provided with contact points 74 and 75 to coöperate with the points 62 and 63. As already described in connection with the resetting mechanism, the fingers 21 and 22 extend upwardly into position to be engaged by the lateral projections 20 of the reset bar 16.

The contact arm 67 has a contact point 78 which is adapted to coöperate with a contact point 79 of the member 60.

The escapement member 32 as clearly shown in Fig. 4, has the general form of a hollow rectangular plate 80 pivotally suspended by a pin 81 from the armature 31 of the actuating magnet. The escapement has a projection 82 which extends downwardly through a slot 83 in a guide rod 84. This guide rod may conveniently be a stud, screwed into the frame 26 of the unit at 85 and having a pair of nuts 86 constituting limits between which the projection 82 extends.

The escapement plate 80 has an actuating projection 87, a lug 88 forming a shoulder against which the teeth of the ratchet wheel 34 come to a stop. The escapement plate is similarly provided on its opposite side with a lug 89 which forms a stop and an actuating projection 90 which actuates the ratchet when the magnet 30 is energized and the escapement lifted. When the magnet is deënergized, the armature 31 and the escapement falls and the ratchet is again actuated but this time by the finger 87. The arrangement of parts is such that this successive energization of the magnet produces a step by step rotative movement of the spindle 33.

The operation of the device and the circuit connections for the same will now be discussed.

Figure 2:
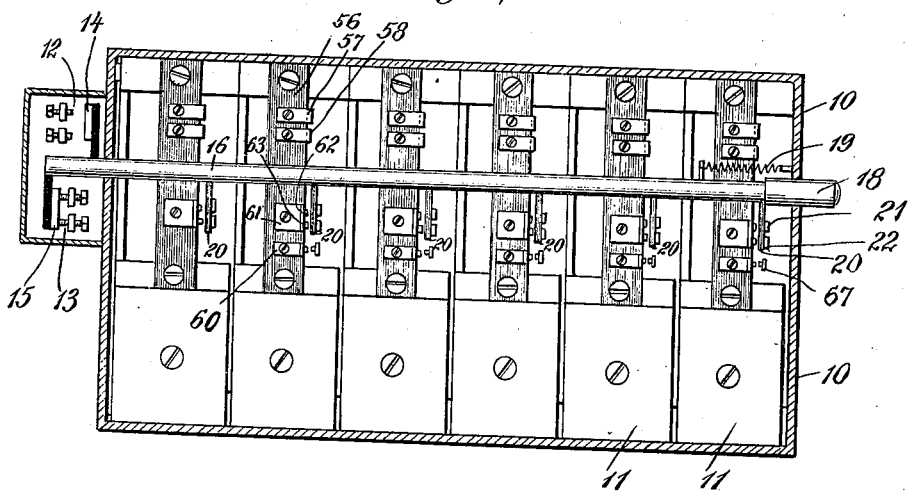
Fig. 2 is a sectional plan view of the mechanism shown in Fig. 1.

As long as the reset mechanism is held in its inactive position by the spring 19, as shown in Figs. 2 and 9, the reset switches, comprising the fingers 21 and 22, are held open. Each of the transfer switches, comprising the contacts 78 and 79, is held open by the cam 65 except when the lug 70 falls in the notch 73 and the arrangement of parts is such that this occurs once in each revolution of the cam, the number plate 52 being affixed to the spindle 33 revolves once for each revolution of the spindle and it is set relative to the cam so that the transfer switch is closed when the number plate indicated "9" and is open to interrupt circuit as explained below when the magnet 30 is deenergized and the escapement mechanism falls; in other words, when the number plate moves from "9" to "0." Thus the transfer switch is closed and opened whenever the number disk is moved from "9" to "0."

Referring particularly to Figs. 2 and 9, it may be assumed that the parts occupy the positions shown and that all of the number plates register "0."

In the diagram of Fig. 9, 92 designates a circuit making and breaking device which is responsive to the succession of events which are to be counted by the mechanism. It is shown in its closed position and a circuit is completed from one terminal 93 of a suitable source of electric energy such as a battery 94, through the circuit breaker 92, a conductor 95, magnet coil 30ᵃ which is the actuating coil for the section in the units place, a conductor 96, switch 13, which is closed, a conductor 97, and a line conductor 98 which is connected to the opposite terminal 99 of the battery. The magnet of the units section is thus momentarily energized with the result that the core 31 is raised and dropped carrying the escapement mechanism with it and actuating the spindle 33 through the ratchet wheel 34 so as to turn the number plate 52 from "0" to "1." Each successive closing and opening of the circuit breaker 92 moves the number plate to a higher number until "9" is reached. Then when the circuit breaker 92 is next closed and opened, not only is the number disk on the units section moved from "9" to "0," but the transfer switch which may for convenience be designated 78ᵃ, is momentarily closed.

A circuit is established through the transfer switch from conductor 95 through coil 30ᵇ of the tens section, through transfer switch 78ᵃ of the units section, and conductor 100 to the negative conductor 98. The transfer switch 78ᵃ is not again energized until the spindle 33 makes another complete revolution and until the units disk has again successively indicated numbers from "0" to "9" inclusive. The counter during this period has of course shown readings from 10 to 19. The transfer switch 78ᵃ is then again closed and the coil 30ᵇ energized. Thus the number disk on the tens section is advanced once for each revolution of the spindle until finally the device indicates 99. The next closing and opening of the circuit breaker 92 produces an energization of not only the transfer switch 78ᵃ but also the transfer switch 78ᵇ of the next unit. Thus all three magnets a, b, c, are energized and the machine indicates 100. The operation of the device continues in like manner until the highest number which can be produced on the machine is reached.

The machine is intended to be utilized where it has ample capacity and the number of sections will depend on the size of the numbers to be dealt with.

In order that the attendant may be warned when the mechanism has concluded any predetermined count, the number plates 53 may be set at a desired limit by turning the shaft 46. The turning of the shaft produces an adjustment of the sleeve 38 in accordance therewith.

The arrangement of the commutator segments 44 is such that they will bridge contacts 41 and 42 when the disks 52 and 53 produce a like indication.

The circuit connections for the contacts 41 and 42 are completed through the contact rings 39 and 40 and contact fingers of brushes 57 and 58. These brushes are shown in the diagram of Fig. 9, the brush 57 of the units section being connected to the brush 58 of the tens section and so on.

The circuit is completed from the battery terminal 93 through conductor 102, then through the various contacts which are arranged in series, conductor 103, a signal device such as a bell 104, and conductor 98 to the opposite terminal 99 of the battery.

It is evident that this circuit cannot be completed until each pair of contact fingers 57 and 58 is bridged. Consequently the signal will not be energized by completing the circuit until each of the number plates which designate the count correspond to the number plate 53 of the same unit.

If the number at which a signal is to be given has less digits than the number of sections of the device, the higher sections will be set at "0".

With respect to the resetting, assuming that the count has been secured and it is desired to start a new count from "0", the push button 18 is pushed inwardly in opposition to the spring 19, permitting the reset switches composed of contact fingers 21 and 22, to close to connect the upper terminal of each magnet with one side of the battery. Under these conditions the switch 13 will be opened and the switch 12 closed to connect the lower terminal of each magnet with the other side of the battery.

If the number plate of any of the counters is at "0", its reset switch will be held open independently of the reset bar on account of the formation of the cam 64 as clearly shown in Fig. 6. Consequently the sections which already indicate "0" will not be disturbed. The others will be successively energized until they are advanced to indicate "0". This is accomplished by the intermittent motion imparted by the cam 64 to the contact fingers 21—22 which in each section gives a sufficient number of impulses to its actuator to bring its number plate to zero and to close its transfer switch to start the actuator of the adjacent unit into action. Thus the rod 16 may be pushed in and held until the number plates 52 of all the sections have been returned to their initial positions. The mechanism is then in condition to be used for another count as soon as the push button is released.

Attention is directed to the fact that when the switch 13 is opened by actuating the push button, the counting circuit established therethrough for the actuating coil 30ª, is interrupted. Consequently the units counting disk will not be actuated as described for counting.

Variations in size and arrangement of parts may be effected within the spirit and scope of my invention, and I intend only such limitations as are imposed by the appended claims.

What I claim is:

1. A counting mechanism comprising a frame, a rotatable spindle, a number plate and a movable contact connected to be driven by the spindle, an adjustable relatively stationary contact member adjacent to the movable contact, a signal contact plate connected with the adjustable member, means for setting the positions of the adjustable contact and signal number plate and a signal adapted to be energized by the contact of the movable and adjustable contacts.

2. A counting mechanism comprising a frame, a rotatable spindle, a number plate and a commutator connected to be moved by the spindle, a rotatively adjustable relatively stationary contact member adjacent to the commutator, a signal number plate connected with the adjustable contact member, means for setting the positions of the adjustable contact member and the signal number plate, and a signal adapted to be energized when the adjustable contact member contacts with the commutator.

3. A counting mechanism comprising a plurality of sections, each having a number member, an actuator and a transfer switch adapted to be connected with the actuator of the adjacent unit, and a reset switch, means for successively energizing the actuator of one of the sections, means for normally retracting the reset switch and means for actuating the reset switches to energize the actuator of each section.

4. A counting mechanism comprising a plurality of sections, each having a number member, an actuator and a transfer switch adapted to be connected with the actuator of the adjacent unit, and a reset switch, means for successively energizing the actuator of one of the sections, means for normally retracting the reset switch and for completing the circuit of the units section and means for breaking the circuit of the units section and actuating the reset switches to energize the actuator of each section.

5. A counting mechanism comprising a frame, a rotatively adjustable signal contact carrying member, a spindle coaxially rotatable therewith and having a coöperating contact member, a number indicator on the spindle, and means for producing a step by step rotative movement thereof.

6. A counting mechanism comprising a frame, a rotatively adjustable signal contact carrying member, a spindle coaxially rotatable therewith and having a coöperating contact member, a number indicator on the spindle, and an electro-responsive escapement mechanism for producing a step by step rotative movement of the spindle.

7. An escapement mechanism comprising a toothed wheel, a reciprocating actuator movable at right angles to the axis of the wheel, and a rigid one-piece member having an actuator and a stop on one side of the wheel, and a stop and an actuator on the opposite side of the wheel.

8. An escapement mechanism comprising a toothed wheel, a reciprocating actuator movable at right angles to the axis of the wheel, and a rigid one-piece member formed to provide a pair of shoulders on one side of the wheel adapted respectively to act as an actuating and stop projection and formed on the opposite side on the wheel with projections constituting respectively an actuator and a stop.

9. A counting apparatus comprising a plurality of sections, each having an electric actuator, and a reset switch, yielding means for holding the reset switches open, a circuit interrupter for successively making and breaking the circuit of the electric actuators, and a pair of selective switches dependent on the yielding means for connecting the electric actuators either to the circuit breaker or in the reset circuit.

10. A counting mechanism comprising a plurality of sections each having an actuating magnet, a reset switch and a transfer switch, the coil of each section after the units being connected to the transfer switch of the preceding section and each coil being connected to the reset switch of the same section, a circuit interrupter for making and breaking the circuit of the actuating coils and a change-over switch for either closing a reset circuit independently of the circuit breaker or closing the circuit of the units actuating magnet dependent on the circuit breaker.

11. A counting mechanism comprising a plurality of sections each having an actuating magnet, a reset switch and a transfer switch, the coil of each section after the units being connected to the transfer switch of the preceding section and each coil being connected to the reset switch of the same section, a circuit interrupter for making and breaking the circuit of the actuating coils and a change-over switch for either closing a reset circuit independently of the circuit breaker or closing the circuit of the units actuating magnet dependent on the circuit breaker, and a reset bar connected to the said change-over switch and having means for holding the reset switches open when the units coil circuit is closed.

12. A counting apparatus comprising a plurality of counting members, an electro-responsive actuator for each member, a reset switch and a transfer switch for each actuator, the electro-responsive actuator for each member being connected to the transfer switch of the preceding member, and also connected to the reset switch of the same member, and a change-over switch adapted in one position to complete a reset circuit dependent on the reset switches and in another position to complete a circuit for the actuator of the units counting member.

13. A counting mechanism comprising a plurality of rotary counting members and an electric coil for actuating each member, a transfer switch adapted to be closed once in each revolution of the counter, a reset switch for each actuator, a reset bar having projections for holding the reset switches open, a change-over switch actuated by the reset bar and composed of a counting circuit switch and a reset circuit switch, and means tending to hold the counting circuit switch closed, said reset switches being released when the reset circuit switch is closed.

14. A counting mechanism comprising a plurality of counters, a plurality of adjustable switches for the several counters each adapted to be closed when its counter occupies a predetermined position, a signal adapted to be energized when the adjustable switches are closed, actuating coils for the several counters, a counting switch in circuit with the units counter, and a transverse switch in circuit with each of the other counters.

15. A counting mechanism comprising a plurality of counters, a plurality of adjustable switches for the several counters each adapted to be closed when its counter occupies a predetermined position, a signal adapted to be energized when the adjustable switches are closed, actuating coils for the several counters, a counting switch in circuit with the units counter, a transfer switch in circuit with each of the other counters, and reset switches for the counters.

16. A counting mechanism comprising a plurality of counters, a plurality of adjustable switches for the several counters each adapted to be closed when its counter occupies a predetermined position, a signal adapted to be energized when the adjustable switches are closed, actuating coils for the several counters, a counting switch in circuit with the units counter, a transfer switch in circuit with each of the other counters, reset switches for the counters, and interlocking means for opening the counter switch when the reset switches are closed.

17. A counting mechanism comprising a plurality of rotatable number plates, an electromagnetic actuator for each plate, a reset switch adapted to be connected with all of the actuators, and means movable with each of the number plates to open the connection of the reset switch with its respective actuator when said plate is in its initial position.

18. A counting mechanism comprising a plurality of interchangeable sections, each having a number plate, a reset switch, a circuit interrupter, a transfer switch, and an actuator for the number plate, the reset switch and the circuit interrupter and the transfer switch, the electromagnetic actuator of each section but one being connected with the transfer switch of the preceding section, and a manual switch for closing the circuit of the actuator of the first section, each circuit interrupter being provided with means for opening the circuit of its actuator when its number plate reaches its initial position and its transfer switch is closed.

In witness whereof, I have hereunto set my hand this 19 day of Sept., 1917.

EDWIN H. MESSITER.